United States Patent [19]

Fitchman et al.

[11] 4,008,354

[45] Feb. 15, 1977

[54] PRESSURE VENT-SEALED PRIMARY AND SECONDARY ALKALINE CELLS

[75] Inventors: Arthur Fitchman, Yonkers, N.Y.; Terry Doug Wyatt, Cleveland, Tenn.

[73] Assignee: P. R. Mallory & Co., Inc., Indianapolis, Ind.

[22] Filed: May 12, 1975

[21] Appl. No.: 576,406

[52] U.S. Cl. .............................. 429/56; 220/207; 29/623.2

[51] Int. Cl.² ................................. H01M 2/12

[58] Field of Search .......... 136/133, 177, 178, 179; 220/203, 205, 207, 367; 29/623.2; 429/56

[56] References Cited

UNITED STATES PATENTS

| | | | |
|---|---|---|---|
| 2,144,959 | 1/1939 | Blackburn | 136/133 |
| 3,669,302 | 6/1972 | Markarian | 220/207 |
| 3,855,006 | 12/1974 | Kegelman | 136/177 |
| 3,877,992 | 4/1975 | Urry | 136/133 |

*Primary Examiner*—Donald L. Walton
*Attorney, Agent, or Firm*—Ronald S. Cornell; Israel Nissenbaum; Charles W. Hoffmann

[57] ABSTRACT

An extrudible hot melt adhesive material is utilized in a low cost vent for an electrochemical cell to relieve abnormal pressure formed during improper use of the cell. The extrudible hot melt adhesive material is suitably joined or bonded to a member used to provide a cell top, and covers and fills a vent hole formed in the member. Material is extruded through the vent hole by abnormal pressure to open the vent hole and allow the abnormal pressure to be released through the opened vent hole. The venting pressure can be predetermined by varying vent hole diameter, amount of adhesive, and the composition of the filler adhesive material with respect to viscosity.

6 Claims, 3 Drawing Figures

PRESSURE VENT-SEALED PRIMARY AND SECONDARY ALKALINE CELLS

Electrochemical cells when improperly used such as by electrically shorting the electrodes, overcharging, overdischarging, overheating and the like, develop abnormal internal gas pressures which when sufficiently high can cause rupture of the cell container.

This invention relates to pressure sensitive devices for the release of such abnormal pressures in electrochemical cells and to a method of making the same.

Prior pressure release devices suffer variously from poor precision, high cost and inadequate sealing when used with small, low cost cells.

Known are rupture membranes which help provide closure of the cell until pressure within the closure is sufficient to rupture the membrane. The release pressure of the membrane is determined however, not by the stable elastic properties of the material of the membrane but by its plastic deformation behavior, which varies widely with the composition and the mechanical and thermal history of the material of the membrane. Therefore, while closure by the membrane is usually adequate, the cost of precision in the release pressure is high.

It is, therefore, an object of this invention to provide a low cost pressure sensitive vent and a method of making the same, the vent includes a member with a vent hole and extrudible hot melt adhesive material joined to the member to close the vent hole, the material capable of extruding when subjected to abnormal pressure to open the vent hole and allow abnormal pressure to be released through the opened vent hole.

A further object of this invention is to provide a method of making a pressure sensitive vent including the step of applying an extrudible hot melt adhesive material to a member with a vent hole to join or bond the extrudible material and the member to close the vent hole, preferably the extrudible material is applied to a preheated surface of the member.

It is another object of this invention to provide a pressure sensitive vent and method of making the same which combines reliability, predictability, economy and flexibility without interfering in the normal operation of the cell.

It is another object of this invention to provide a means by which the venting pressure can be reliably predetermined when manufactured on a large scale production basis.

Other objectives of this invention will become apparent from a further description of the invention and the drawings.

Figure 1:
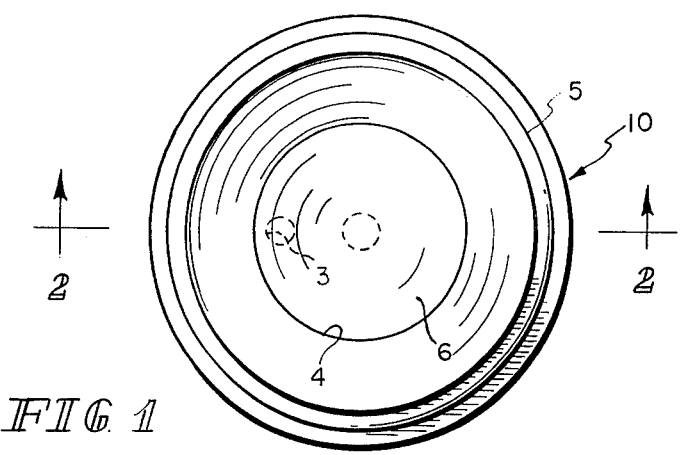
FIG. 1 is a plan view of a vent embodying the concepts of the present invention.

This invention involves the application of an extrudible hot melt adhesive material to a member with a vent hole to join or bond the extrudible material and the member to close the vent hole and form a cell top. Preferably, a surface of the member is heated prior to application of the extrudible material to facilitate joining or bonding of the material and the member. Previously, extrudible hot melt adhesive materials were unsuccessful in providing a reliable joint or bond at the interface between the material and the member because little, if any, joining or bonding occurred in a manner to reliably resist extrusion at pressures which are elevated but not abnormal. It was unexpectedly found that heating a surface of the member prior to application of the extrudible hot melt adhesive material resulted in the formation of a cohesive bond therebetween capable of withstanding the elevated pressures and being operably broken and extruded through a vent hole at predetermined abnormal pressures. Another less preferred method of joining or bonding the extrudible hot melt adhesive material and the member includes applying the material as a hot liquid by means of an applicator nozzle which is positioned close to the application surface of the member during the application step so that sufficient heat is transferred from the applicator nozzle by means of the adhesive to the application surface of the member to result in joining or bonding of the adjacent surfaces of the material and the member. In either method of application the extrudible hot melt adhesive material is applied to what will be the inner surface of the member, i.e. that surface which faces the interior of the cell when the cell is assembled, in such a manner as to substantially completely fill the vent hole and then to substantially completely fill a shallow depression formed in the member in which the vent hole is formed. The material in the shallow depression of the member acts as a firm anchor for the material in the vent hole and allows for more accurate control of the extrusion pressure required to open the vent hole. Prior to further handling of the vent, the applied extrudible hot melt adhesive material is allowed to cool and harden or cure.

Among other functions, the shallow depression facilitates the application of the extrudible hot melt adhesive onto the member and into the vent hole.

Venting of the container of the cell occurs when the internal pressure thereof reaches a predetermined abnormal level at which time the abnormal internal pressure extrudes through the vent hole to open the vent hole material in the vent hole and material covering the surface of the shallow depression of the member having formed therein the vent hole. The open vent hole provides a route for release of the abnormal pressure and the container of the cell is no longer subject to possible rupture.

The venting pressure level can be adjusted to a tolerance of about ± 10% in at least three ways in order to cover a range of 100 to 700 psi as needed in a wide variety of cells requiring venting.

The venting pressure can be adjusted by means of varying the diameter of the vent hole. A smaller hole will vent at higher pressures than a larger hole if the amount of the adhesive material used is the same.

Adjustment can also be made by varying the amount of adhesive material used so that a larger amount of adhesive material will vent at higher pressures than a smaller amount if the hole diameter is kept constant.

By varying the composition of the material such as by using extrudible hot melt adhesive materials of varying viscosities, the venting pressure can be varied. High viscosity materials will vent at higher pressures than low viscosity materials if the vent hole diameter and amount of material used remain constant.

The length of the vent hole can also be varied to provide some control of the venting pressure but this does not appear to be as desirable as the previously mentioned methods because it entails a variation in the thickness of the member having formed therein the vent hole.

Referring now to the drawing, FIG. 1 illustrates a vent 10 with a vent hole 3 at the periphery of a shallow depression 4 formed in member 5 to be used as a cell top. Other placement relationships of the vent hole 3 in the shallow depression 4 are possible.

Figure 2:
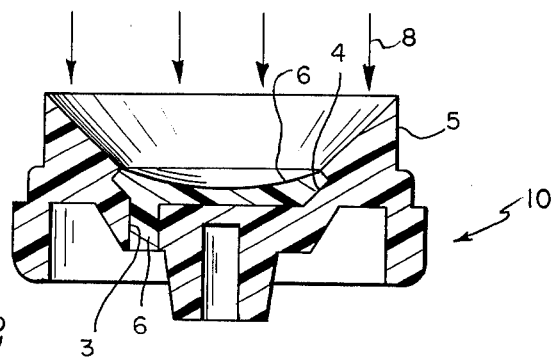
FIG. 2 is a section view of the vent taken along line 2—2 of FIG. 1.

FIG. 2 shows the member 5 after an extrudible hot melt adhesive material 6 has been applied to the surface of the shallow depression 4 of the member 5 and to the vent hole 3. The penetration of extrudible hot melt adhesive material 6 into the vent hole 3 should be substantially complete in order to maintain good predictability and reliability in the venting pressure required to extrude material 6 through vent hole 3 to open the vent hole and relieve the venting pressure. When an abnormal internal pressure, as shown by the arrows 8, builds up, extrudible adhesive material 6 in the vent hole 3 and extrudible adhesive material 6 in the vent hole 3 and extrudible adhesive material 6 in the shallow depression 4 of the member 5 are extruded or forced out of the vent hole 3 by the pressure at a predetermined abnormal level to open the vent hole and the cell vents the abnormal pressure through the open vent hole.

Figure 3:
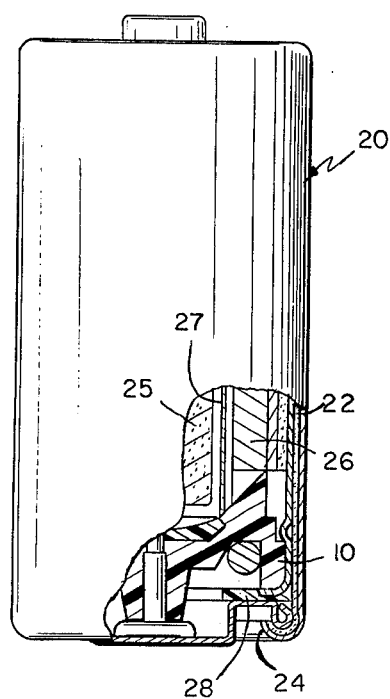
FIG. 3 is a partial section view of an electrochemical cell using the vent of FIGS. 1 and 2.

FIG. 3 is a partial section view of an electrical device 20 (an electrochemical cell) having a container 22 with an open end 24 closed by the vent 10 of FIGS. 1 and 2. The vent 10 should be positioned in the open end 24 of the container 22 so that the shallow depression 4 is interior of the electrical device 20. If internal pressures within the electrical device 20 reach an abnormal level, extrudible hot melt material 6 in the vent hole 3 and over and joined or bonded to the surface of the shallow depression 4 of the member 5 will be extruded or forced through the vent hole 3 by the abnormal pressure thereby allowing such pressure to be released through the vent hole 3 without harmful rupture of the container 22.

The electrical means of the electrical device 20 (an alkaline cell of AA size) includes a positive electrode 26 of a suitable metal oxide, a negative electrode 25 of a suitable substantially pure metal, an alkaline electrolyte in absorbent 27, and an insulating film 28. One type of alkaline electrochemical cell uses a nickel dioxide ($NiO_2$) positive electrode, and an iron (Fe) negative electrode with an electrolyte including potassium hydroxide (KOH) and distilled water ($H_2O$). Other types of alkaline electrochemical cells include nickel dioxide ($NiO_2$)-cadmium (Cd) cells, silver oxide ($Ag_2O$)-zinc (Zn) cells, and manganese dioxide ($MnO_2$)-zinc (Zn) cells.

An example of a cell venting means is given only for illustrative purposes and it is not meant to restrict the scope of this invention and other embodiments within the spirit of this invention are also included in this invention.

EXAMPLE

A nylon member 5 (Nylon 101L sold by I. E. Du Pont de Nemours, and Company of Wilmington, Delaware, U.S.A.) intended for use as part of a cell top in alkaline size AA cells is formed with a small diameter vent hole 3 of about 0.040 inches. The vent hole 3 extends from the shallow depression 4 of the member 5 to the opposite surface with a penetration of about 0.030 inches. The shallow depression 4 of the member 5 is preheated to about 160° F, through the preheating temperature can range to about 200° F, prior to the application of extrudible hot melt adhesive material 6. The hot metal adhesive material 6 (thermoplastic polyamide base material A6575 sold by Biwax Corporation of Chicago, Illinois, U.S.A.) having characteristics of a viscosity of about 280 cps at about 380° F and about 184 cps about 420° F and a preferred application temperature between about 380° to 415° F is applied to the vent hole 3 in the member 5 and the preheated surface of the shallow depression 4 of the member 5 adjacent the vent hole 3. The amount of material 6 applied to the inner surface 7 of the member 5 is in the range of from about 0.050 to about 0.75 gms. The material 6 and the surface of the shallow depression 4 are joined or bonded together. A cell constructed with this specially constructed vent released at a pressure of 600 psi ± 60 psi.

The extrudible hot melt adhesive material 6 closing the vent hole 3 must join or cohere to the adjacent surface of the shallow depression 4 of the member 5. Joining the extrudible hot melt adhesive material 6 to the surface of the shallow depression 4 and to the side walls of the vent hole 3 is important for several reasons. One of the reasons is that in order for the extrudible hot melt adhesive material 6 to withstand pressures less than abnormal pressure without extruding through the vent hole and yet provide the feature of extruding through the vent hole when subjected to abnormal pressure, the material 6 must be joined to the surface of the shallow depression and to the side walls of the vent. Another reason is that a joint between material 6 and the adjacent surface of the shallow depression 4 helps to confine electrolyte within the cell and to prevent the ingress of harmful contaminates to the interior of the cell. The hot melt extrudible hot melt adhesive materials includes hot melt adhesives such as the thermoplastic polyamide base material of the Example, silicones, silicone rubbers, other rubbers and the like. The extrudible hot melt adhesive material may also include fillers to decrease the flowability and/or increase the strength of the material. Suitable fillers may include asbestos powder, talc, clay, fibrous material and the like.

The member 5 of the vent may be of any suitable substantially rigid material such as metal, metal alloy, ceramic, thermosetting resin or thermoplastic resin which is unaffected by the nature of the elements of the electrical device. For low cost, high electrical insulation, low gas permeability, strength and durability, thermoplastic resins such as polyamides (nylon 101L of the example), polypropylene, polyethylene and modified polystyrenes, or thermosetting resins such as epoxies and most fluorocarbons are preferred.

While the vent of the present invention is adaptable for use in alkaline cells, it is also adaptable for use in a variety of electrical devices such as primary and secondary electrochemical cells, capacitors and the like. Therefore, although the vent and its method of making is disclosed with reference to an alkaline electrochemical cell of size AA, it is not limited thereto.

What is claimed is:

1. A method of making a pressure responsive vent for and electrical device having a member with a vent hole therein wherein said vent hole is closed with a hot melt, extrudible material comprising the steps of pre-heating said member to a temperature which facilitates joining the extrudible material and the member, and applying said hot melt, extrudible material to said member to close said vent hole, whereupon said extrudible material and said member becomes bonded to each other and said extrudible material is capable of being extruded through the vent hole upon development of a predetermined abnormal pressure thereby allowing said abnormal pressure to be relieved through said vent hole.

2. The method as in claim 1 wherein the member is selected from the group of metals, metal alloys, ceramics, thermosetting resins, thermoplastic resins and combinations thereof.

3. An electrochemical cell comprising a container having an open end; electrical means within the container; and a vent closing the open end of the container; said vent being a pressure responsive vent comprising a member having a vent hole formed therein, said member including a shallow depression facing inwardly of the container, and an extrudible hot metal material joined to the member and closing and at least partially filling the vent hole and extending over at least a portion of the depression and joined to the surface of the shallow depression of the member, said extrudible material having been applied while said member was preheated, and said extrudible material being capable of being forced through the vent hole when subjected to an abnormal pressure to thereby open the vent hole and allow the abnormal pressure to be released through the open vent hole.

4. The electrochemical cell of claim 3, wherein the electrochemical cell is an alkaline cell.

5. An electrical device comprising a container having an open end, electrical means within the container, and a vent closing the open end of the container, said vent being a pressure responsive vent comprising a member having a vent hole formed therein and an extrudible hot melt material joined to the member and closing and at least partially filling the vent hole, the extrudible material including an enlarged portion thereof positioned inwardly of said container, the extrudible material being capable of having a segment thereof extruded through the vent hole when subjected to an abnormal pressure to open the vent hole and allow the abnormal pressure to be released through the open vent hole, and said extrudible material having been applied while said member was preheated.

6. The electrical device of claim 5, wherein the member includes a shallow depression, and the enlarged portion of extrudible material is over at least a portion and joined to the surface of the shallow depression of the member.

* * * * *